Patented Apr. 23, 1929.

1,710,007

UNITED STATES PATENT OFFICE.

ERNST PFEFFER, OF SCHWANHEIM-ON-THE-MAIN, GERMANY, ASSIGNOR TO GRASSELLI DYESTUFF CORPORATION, OF NEW YORK, N. Y., A CORPORATION OF DELAWARE.

PROCESS FOR PRINTING WITH VAT-DYESTUFFS MIXED WITH CELLULOSE ESTERS OR ETHERS.

No Drawing. Application filed October 15, 1927, Serial No. 226,521, and in Germany October 26, 1926.

The present invention relates to a process for printing with vat-dyestuffs and material impregnated or printed with a vat-dyestuff mixed with a solution of a cellulose ester or cellulose ether.

In printing fabrics with vat-dyestuffs, the dyestuff is thickened by means of a starch or gum solution and then printed with the addition of an alkali and a sulfoxylate. In order to fix the vat-dyestuff, the material is steamed after printing and then washed and finished. This process is suitable for material which is printed on the usual machines, but in printing by hand or by stencilling difficulties arise as, contrary to machine printing, it is in this case often not possible to print the material and steam it as well in one day, and if the material is allowed to remain for a long time before it is steamed, the sulfoxylate decomposes in the thinly printed layer so that a reduction during the steaming operation cannot take place and the dyestuff will be fixed on the fiber only imperfectly or even not at all.

My invention is based on the discovery that these disadvantages are obviated by mixing the dyestuff intimately with a solution of a cellulose ester or cellulose ether i. e. of an organo-oxy derivative of cellulose, printing this mixture on the material and treating the material, before steaming, with a solution of a reducing agent, such as for instance of a sulfoxylate, and an alkali. Water-soluble cellulose-alkyl ethers have proved to be particularly suitable for this purpose. By the treatment with the reducing agent and an alkali, the cellulose ester or ether is salted out and the dyestuff does not bleed into the unprinted parts. The usual starch or gum thickenings by themselves do not come into question for this purpose as they would easily bleed. By the new process, the material may be printed and stored and later on developed, even after the lapse of a considerable time, a fact which is a great technical advantage.

My new process of printing with vat-dyestuffs mixed with cellulose esters or ethers, particularly with water-soluble cellulose alkyl-ethers, is also suitable for printing material by means of a printing machine of the type hitherto used only for paper-printing. On such machines, the printing rollers of which are engraved photographically, the usual printing colors containing starch or gum as well as a reducing agent and an alkali, cannot be used, because in view of the fine engraving it is not possible to incorporate with the said printing colors a quantity of dyestuff sufficient for producing a printing effect with a deep shade. For this reason vat-dyestuffs have not yet been used for printing fabrics on such machines. The process of my present invention is very suitable for this purpose, because it permits the preparation of printing colors which contain large quantities of dyestuff dissolved in solutions of cellulose esters or cellulose ethers. After printing, the material is treated with the quantity of reducing agent and alkali necessary for fixing the dyestuff and then steamed; in this way artistic printing effects are obtained which cannot be produced in the same beautiful style on an ordinary machine for printing fabrics.

The following examples serve to illustrate my invention, but they are not intended to limit it thereto:

1. The material is printed with the following printing color (by block-printing):

*Printing color.*

200 grams of the black vat-dyestuff in paste form prepared according to German Patent No. 241,997.
100 grams of water,
700 grams of thickening M.
———
1 kilo.

*Thickening M.*

100 grams of methyl cellulose are dissolved in
900 grams of cold water
———
1 kilo.

After printing, the material is padded with the following solution:

*Padding liquor.*

200 grams of Rongalite C 1:1
80 grams of glycerine
30 grams of dissolving salt B
120 grams of potassium carbonate
570 grams of water
———
1 kilo.

The material is then dried and steamed with wet steam for 5 minutes at 101° C. in a rapid-ager (Mather-Platt) freed from air, finally washed and soaped at the boil.

Instead of methyl cellulose there may also be used other water-soluble alkyl-celluloses, for instance water-soluble ethyl-cellulose.

2. The material is printed with the following printing color:

*Printing color.*

200 grams of the black vat-dyestuff in paste form prepared according to German Patent No. 241,997,
100 grams of acetone,
700 grams of thickening A 1 kilo.

*Thickening A.*

80 grams of ethyl cellulose dissolved in
920 grams of acetone 1 kilo.

The material is further treated as indicated in Example 1.

3. The material is printed with the following printing color:

*Printing color.*

100 grams of the dyestuff in paste form prepared according to U. S. patent specification No. 753,659,
100 grams of benzene,
100 grams of alcohol,
700 grams of thickening B.

1 kilo.

*Thickening B.*

80 grams of ethyl cellulose dissolved in
460 grams of alcohol and
460 grams of benzene 1 kilo.

After printing, the material is padded and finished as indicated in Example 1.

4. For printing on a deeply printing machine is used, for instance, the following printing color:

*Printing color.*

500 grams of the black vat-dyestuff in paste form prepared according to German patent specification No. 241,997,
500 grams of thickening M (see Example 1).

1 kilo.

The material is further treated as above indicated.

In the following claims the term "organo-oxy derivative of cellulose" is to be understood to comprise ethers and esters of cellulose.

I claim:

1. The process for printing with vat-dyestuffs, which comprises printing the material with a vat-dyestuff mixed with a solution of an organo-oxy derivative of cellulose, treating the material subsequently with a reducing agent and an alkali, and finishing it by one of the usual methods.

2. The process for printing with vat-dyestuffs, which comprises printing the material with a vat-dyestuff mixed with a solution of a cellulose ether, treating the material subsequently with a reducing agent and an alkali, and finishing it by one of the usual methods.

3. The process for printing with vat-dyestuffs, which comprises printing the material with a vat-dyestuff mixed with an aqueous solution of a cellulose ether, treating the material subsequently with a reducing agent and an alkali, and finishing it by one of the usual methods.

4. The process for printing with vat-dyestuffs, which comprises printing the material with a vat-dyestuff mixed with an aqueous solution of methyl cellulose, treating the material subsequently with a reducing agent and an alkali, and finishing it by one of the usual methods.

In testimony whereof, I affix my signature.

ERNST PFEFFER.